(12) United States Patent
Zambrano

(10) Patent No.: US 9,783,118 B2
(45) Date of Patent: *Oct. 10, 2017

(54) MOUNTING DEVICE FOR ATTACHING A HIGH LIFT JACK TO A VEHICLE

(71) Applicant: Strattec Security Corporation, Milwaukee, WI (US)

(72) Inventor: Mauricio Zambrano, Stuart, FL (US)

(73) Assignee: Strattec Security Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,189

(22) Filed: Apr. 10, 2017

(65) Prior Publication Data
US 2017/0225625 A1    Aug. 10, 2017

Related U.S. Application Data

(63) Continuation of application No. 14/923,728, filed on Oct. 27, 2015, now Pat. No. 9,616,818.

(60) Provisional application No. 62/073,686, filed on Oct. 31, 2014.

(51) Int. Cl.
*B60R 9/02* (2006.01)
*B66F 1/06* (2006.01)

(52) U.S. Cl.
CPC . *B60R 9/02* (2013.01); *B66F 1/06* (2013.01)

(58) Field of Classification Search
CPC ................. B60R 9/02; B60R 2011/004; B60R 2011/0052; B60R 2011/0066; B60R 2011/0071; B60R 2011/0096
USPC ....... 224/557, 567, 569, 42.13, 42.24, 42.25
See application file for complete search history.

(56) References Cited

U.S. PATENT DOCUMENTS

| | | |
|---|---|---|
| 4,416,402 A | 11/1983 | Matthew |
| 4,718,582 A | 1/1988 | Iovenitti |
| 4,936,531 A | 6/1990 | Bauser |
| 5,641,106 A | 6/1997 | Slaughter |
| 6,129,252 A | 10/2000 | Jackson |
| 6,783,039 B2 | 8/2004 | Zum Mallen |
| 9,505,352 B2 | 11/2016 | Fife |

*Primary Examiner* — Corey Skurdal
(74) *Attorney, Agent, or Firm* — Reinhart Boerner Van Deuren s.c.

(57) ABSTRACT

A mounting device is provided including a bracket to be attached to the vehicle, and a locking pin for locking the high lift jack to the bracket. The bracket includes a front body portion formed, and from which the pin protrudes frontward. The bracket further includes a rear attachment body portion for securing the bracket to the vehicle. The bracket can include at least two nut and bolt sets for securing the high lift jack to the bracket. An upper nut and bolt set including a nut and a bolt can pass through an upper bolt hole of the front body portion, and a lower nut and bolt set including a nut and a bolt can pass through a lower bolt hole of the front body portion. The locking pin can pass through the high lift jack and allow a lock to be coupled to a lock hole in the locking pin that protrudes frontward from the high lift jack.

20 Claims, 7 Drawing Sheets

MOUNTING DEVICE FOR ATTACHING A HIGH LIFT JACK TO A VEHICLE

CROSS-REFERENCE TO RELATED APPLICATION

This patent application is a continuation of U.S. patent application Ser. No. 14/923,728, filed on Oct. 27, 2015, entitled "Mounting Device For Attaching A High Lift Jack," now U.S. Pat. No. 9,616,818, granted on Apr. 11, 2017, which in turn claimed the benefit of U.S. Provisional Patent Application No. 62/073,686, filed on Oct. 31, 2014, entitled "Mounting Device For Attaching A High Lift Jack," both of which are assigned to the assignee of the present invention and both of which are hereby incorporated herein by reference in their entirety.

BACKGROUND OF THE INVENTION

Field of the Invention

The present invention relates generally to automotive accessories, and more particularly, to a mounting device for attaching a high lift jack to a vehicle in a horizontal, vertical, or oblique position.

A jack is a device used for lifting heavy objects. The most common form of a jack is the so-called car jack, floor jack, or garage jack which can lift a car off the ground to allow drivers and mechanics to get underneath the car so that a tire, oil, or some body part like brakes or struts can be changed, the underside of the car can be inspected, or other maintenance can be performed. There are generally two types of jacks, namely mechanical jacks and hydraulic jacks. Mechanical jacks are commonly used by vehicle owners and drivers to perform maintenance at home or in emergency situations, while hydraulic jacks are more commonly used by professional vehicle service personnel.

There are two main forms of mechanical car jacks: scissor jacks and bumper jacks. Scissor jacks, which are presently the most used mechanical car jacks commonly found in the trunk of cars with the spare tire or with the vehicle's tool kit, use a lead screw to translate rotary motion of a crank into linear motion of the scissor arms to lift up or lower down cars. In turn, bumper jacks, which are currently only found in older cars with stronger bumpers, are lever controlled jacks that have a lifting hook mounted on a carriage that is movable along a vertical standard by means of a ratchet mechanism A high lift jack is a special type of bumper jack that is frequently used by off-road enthusiasts. While not a factory-included item, high lift jacks have become a standard feature for aftermarket upgrades on jeeps and other off-road vehicles. As its name suggests, a high lift jack has the capability of lifting a vehicle high off the ground, which is important for off-road vehicles. A high lift jack is a versatile tool as it can also be used for winching, leveraging, hoisting, and many other functions.

At present, high lift jacks are transported on a vehicle in a horizontal position (e.g., on top of the hood, on a roof rack, or on an aftermarket bumper). However, the horizontal position is inconvenient as a user has to lift the jack off the vehicle and then turn it into a vertical position for normal use. After use, the user has to turn the high lift jack back into a horizontal position so as to put it back on the vehicle. Since a high lift jack is a piece of heavy equipment (weighing approximately 30 pounds or more), the lifting and turning of the jack prove to be strenuous and labor intensive.

Accordingly, there is an established need for a convenient and labor-saving mounting device that can attach a high lift jack to a vehicle in a position in which the high lift jack is securely attached and readily accessible to the user, so that mounting and removing the high lift jack can be carried out quickly and easily.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The present invention is directed to a convenient and labor-saving mounting device that is capable of attaching a high lift jack to a vehicle so that the high lift jack can be transported safely and easily reachable to the user. The mounting device and high lift jack can be mounted onto the vehicle in various positions, including a vertical position, in which a user can easily and quickly remove the high lift jack from the vehicle to place it in its natural vertical working position and also mount it back to the vehicle with ease after each use, thus minimizing user manipulation of the high lift jack required to attach/detach the high lift jack to/from the vehicle. The high lift jack can be conveniently locked to the bracket. When the high lift jack is locked to the bracket, the screws that attach the bracket to the vehicle remain inaccessible so that the bracket cannot be unscrewed from the vehicle in order to steal the high lift jack.

In a first implementation of the invention, a mounting device for attaching a high lift jack to a vehicle comprises a bracket to be attached to the vehicle. The bracket includes a front body portion having a front face and a rear face, wherein the front body portion may if desired be oriented generally vertically. The bracket further includes a locking pin protruding frontward from the front face of the front body portion, the locking pin comprising a lock hole defined transversely through the locking pin and arrangeable frontward of and in a spaced-apart configuration with the front face of the front body portion. The locking pin may also or instead have an annular recess located therein near an end thereof. The bracket also includes a rear attachment body portion, arranged rearward of the rear face of the front body portion and supporting, in a spaced-apart configuration, the front body portion. In addition, the bracket includes at least one connecting portion extending between the front body portion and the rear attachment body portion. Attached to the bracket is a spacer. The spacer extends rearward from the front body portion, and includes a support base arrangeable in a spaced-apart configuration from the rear face of the front body portion.

In a second aspect, the rear attachment body portion can include a set of holes therethrough for attachment of the rear attachment body portion to a vehicle surface to which the mounting device is to be attached. The bracket can therefore be attached to the vehicle by screws or bolts, which are inserted through the holes of the rear attachment portion.

In another aspect, the rear attachment body portion can include a non-scratch rear surface for interfacing with the vehicle surface, in order to protect the vehicle surface while carrying the bracket. Alternatively or additionally, the rear attachment body portion can include a rubber gasket at each hole of the set of holes for attachment to a vehicle surface, the rubber gasket arranged rearward from said each hole for interfacing with the vehicle surface.

In another aspect, the front body portion, the rear attachment body portion, and the at least one connecting portion can be plate-shaped, providing a mechanically robust bracket and yet minimizing weight and material usage.

In yet another aspect, the at least one connecting portion can extend rearward and perpendicularly from the front body portion, to increase robustness while supporting the front body portion.

In another aspect, the bracket can further include a sidewall portion which may be oriented generally vertically which is affixed to and extends rearward and perpendicularly from the front body portion and affixed to a connecting portion of the at least one connecting portion. The sidewall portion further reinforces the bracket, and is preferably arranged on a side of the front body portion to minimize any interference with other components of the bracket.

In another aspect, the spacer can be adjustable with respect to the front body portion to adjust a separation of the support base of the spacer with respect to the rear face of the front body portion. This allows a user to readjust the bracket after installing it on a vehicle, to guarantee that the front body portion is arranged properly and/or correctly separated from the vehicle. For instance, the spacer can include a threaded connector engaged with a threaded cavity of the front body portion, and arranged in opposition to the support base.

In another aspect, the support base of the spacer can include a non-scratch rear surface for bearing against a vehicle surface to which the mounting device is attached.

In another implementation, a mounting device for attaching a high lift jack to a vehicle includes a bracket to be attached to the vehicle, the bracket including a front body portion defining at least two holes spaced apart one from the other a distance corresponding to at least two openings in a high lift jack to be attached thereto. The bracket further includes an upper nut and bolt set at a first of the at least two holes and a lower nut and bolt set at a second of the at least two holes. In addition, the bracket comprises a locking pin extending outwardly from the front body portion, the locking pin including a lock hole defined therethrough and arrangeable outward of and in a spaced-apart configuration with the front body portion. The locking pin may also or instead have an annular recess located therein near an end thereof. Further, the bracket includes a rear attachment body portion defining a set of holes therethrough for attachment to a vehicle surface, and at least one connecting portion affixed to the front body portion and to the rear attachment body portion, and maintaining the front body portion in a spaced-apart relationship to the rear attachment body portion. The mounting device further includes a spacer extending rearward from the front body portion, the spacer including a support base arrangeable rearward and in a spaced-apart configuration from the front body portion.

In yet another implementation, a mounting device for attaching a high lift jack to a vehicle includes a front body portion defining at least two holes spaced apart one from the other a distance corresponding to at least two openings in a high lift jack to be attached thereto. The mounting device further includes an upper nut and bolt set at a first of the at least two holes and a lower nut and bolt set at a second of the at least two holes. In addition, the mounting device includes a locking pin extending outwardly from the front body portion, the locking pin including a lock hole defined therethrough and arrangeable outward of and in a spaced-apart configuration with the front body portion. The locking pin may also or instead have an annular recess located therein near an end thereof. Further, the mounting device includes a rear attachment body portion defining a set of holes therethrough for attachment to a vehicle surface, and at least one connecting portion affixed to the front body portion and to the rear attachment body portion, and maintaining the front body portion in a spaced-apart relationship to the rear attachment body portion. The mounting device further includes a spacer extending rearward from the front body portion, the spacer including a support base arrangeable rearward and in a spaced-apart configuration from the front body portion.

These and other objects, features, and advantages of the present invention will become more readily apparent from the attached drawings and the detailed description of the preferred embodiments, which follow.

DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF AN EXEMPLARY EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
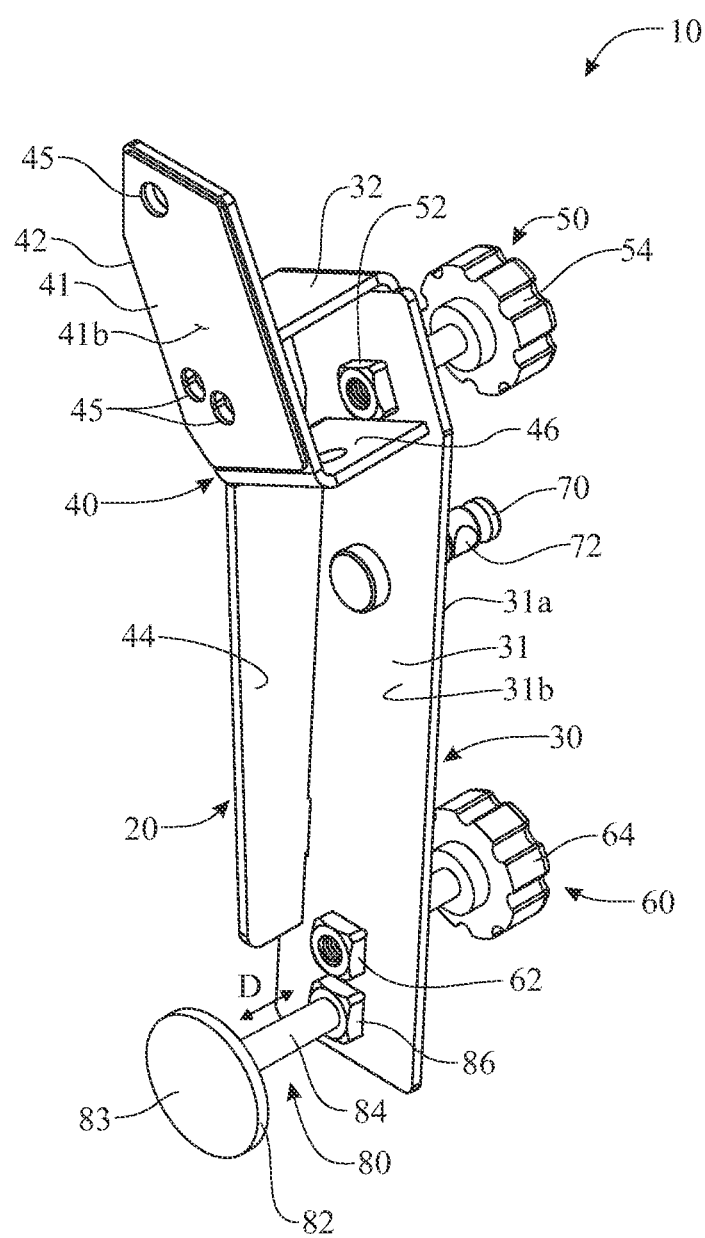
FIG. 1 is an isometric view of an exemplary high lift jack mounting device of the present invention.
Figure 2:
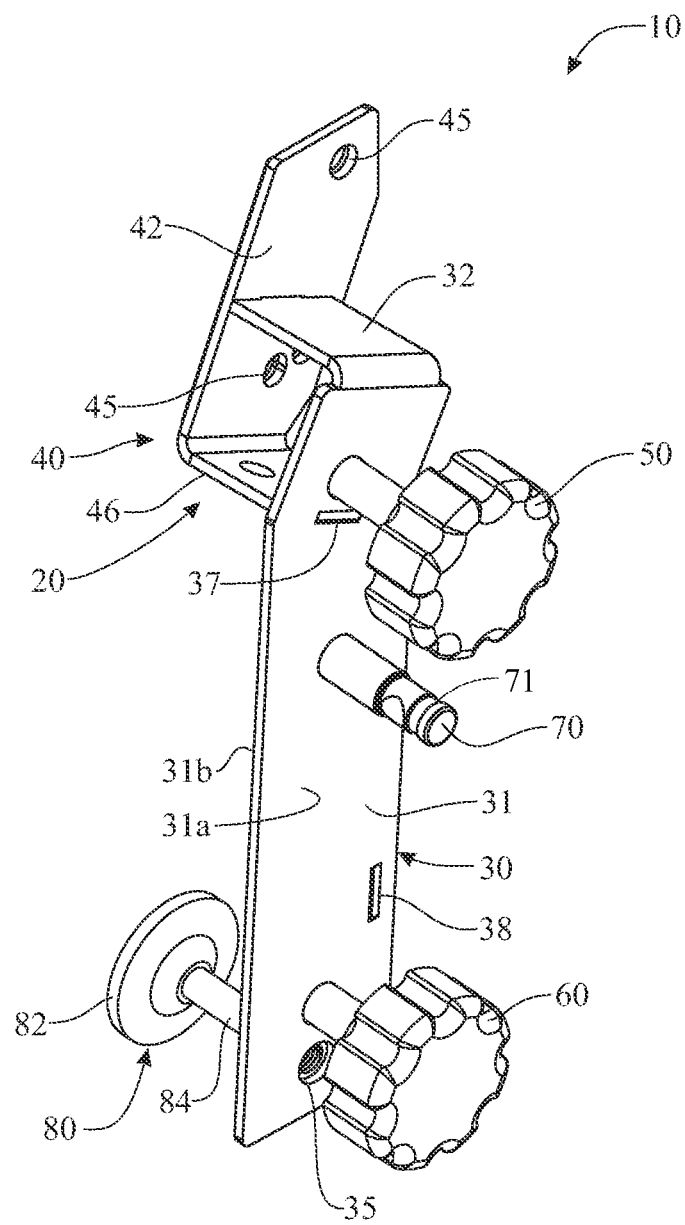
FIG. 2 is another isometric view of the high lift jack mounting device of FIG. 1, shown from a different angle.
Figure 3:
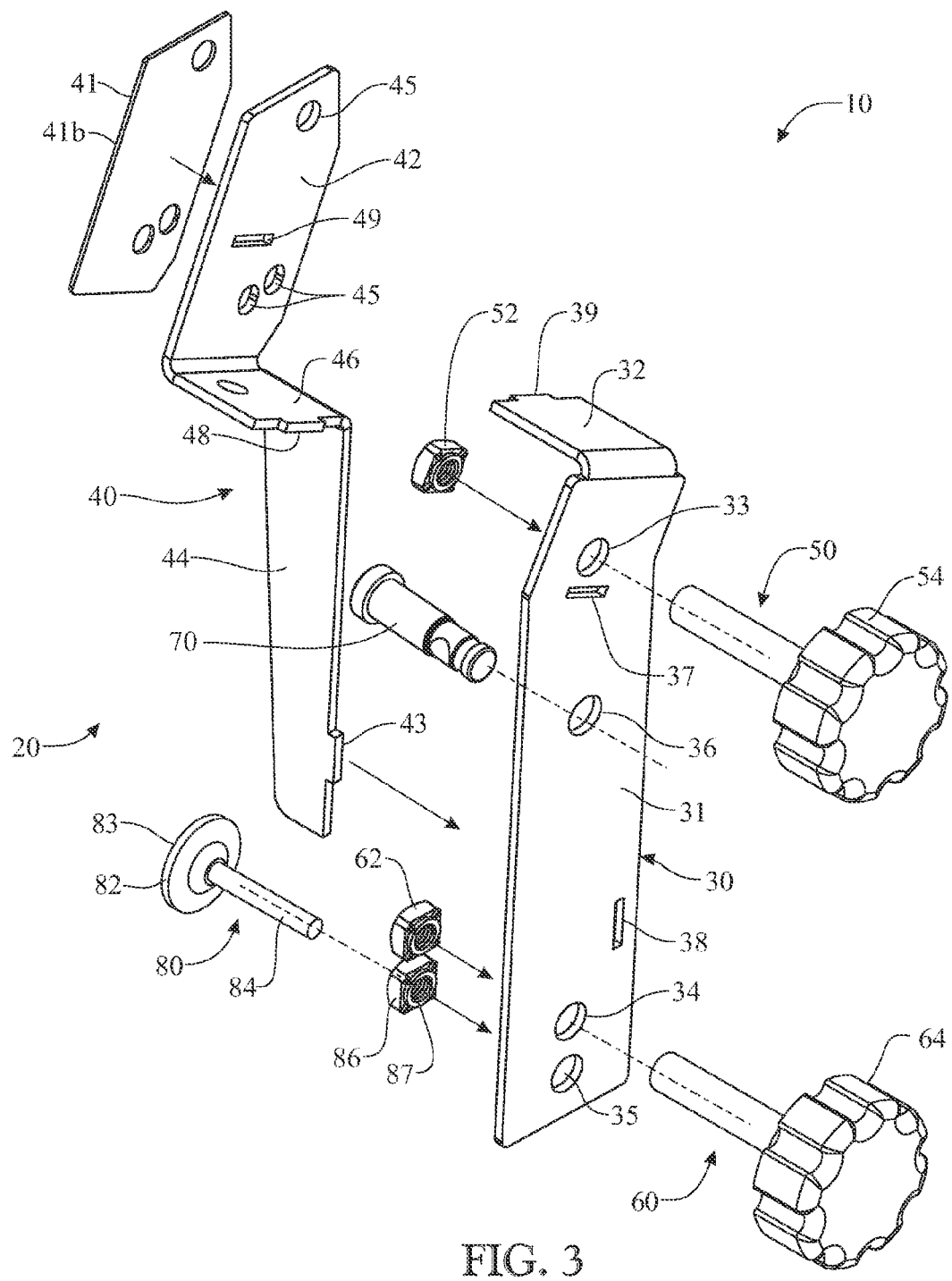
FIG. 3 is another isometric view of the high lift jack mounting device of FIG. 1, shown from a different angle.

Shown throughout the figures, the present invention is directed toward a convenient and labor-saving high lift jack mounting device that can attach a high lift jack to a vehicle in a vertical, horizontal, or oblique position so that mounting and removing the high lift jack can be carried out quickly and easily Referring initially to FIGS. 1 through 3, a high lift jack mounting device 10 is illustrated in accordance with an exemplary embodiment of the present invention. As shown, the mounting device 10 includes a bracket 20, an upper nut and bolt set 50 including a nut 52 and a bolt 54, a lower nut and bolt set 60 including a nut 62 and a bolt 64, a locking pin 70, and a spacer 80.

The bracket 20 includes a first body part 30 which in turn includes a front body portion 31, which may be oriented generally vertically, and a connecting portion 32 formed at an angle with the front body portion 31. As best shown in FIG. 3, the front body portion 31 has an outer, front face 31a and an inner, rear face 31b, and is formed with an upper bolt hole 33, a lower bolt hole 34, a transverse support connector hole 35, a pin hole 36, an upper slot 37, and lower slot 38. The upper nut and bolt set 50 is configured to pass through the upper bolt hole 33 and the lower nut and bolt set 60 is configured to pass through the lower bolt hole 34 for securing a high lift jack 100 (see FIGS. 4-7) to the bracket 20. The locking pin 70 is configured to pass through the pin hole 36. The locking pin 70 is preferably made of metal, such as but not limited to steel, and may be formed with a transverse through hole or lock hole 72 for allowing insertion of a lock 90 (see FIGS. 6 and 7) through the lock hole 72 so as to lock the high lift jack 100 to the bracket 20, as will be explained. The locking pin 70 also or instead has an annular recess 71 (see FIG. 2) located therein near the distal end thereof to optionally facilitate the use of another type of lock known to those skilled in the art instead of using the lock hole 72.

The bracket 20 further includes a second body part 40 for attaching the bracket 20 to a vehicle 200 (see FIGS. 4-7). The second body part 40 includes an upper, rear attachment body portion 42 to be attached to the vehicle 200, a sidewall portion 44 for supporting and reinforcing the first body part 30, and a connecting portion 46 formed at an angle with each of the rear attachment body portion 42 and the sidewall portion 44 for connecting the rear attachment body portion 42 and the sidewall portion 44. In the present embodiment, the angle between the connecting portion 32 and the front body portion 31 of the first body part 30 is substantially the same as the angle between the connecting portion 46 and the rear attachment body portion 42 of the second body part 40; in addition, both connecting portions 32, 46 are arranged transversely, as is the sidewall portion 44 of the second body part 40, while the front body portion 31 and rear attachment body portion 42 are arranged on generally longitudinal planes which may be parallel or substantially parallel to each other. Such transverse arrangement of the connecting portions 32, 46 and the sidewall portion 44 relative to the front body portion 31 and rear attachment body portion 42 allow the connecting portions 32, 46 and the sidewall portion 44 to form a supporting structure that lies between—and provides separation between—the rear attachment body portion 42 (which shall attach to the vehicle) and the front body portion 31 (on which the high jack lift shall rest).

Figure 6:
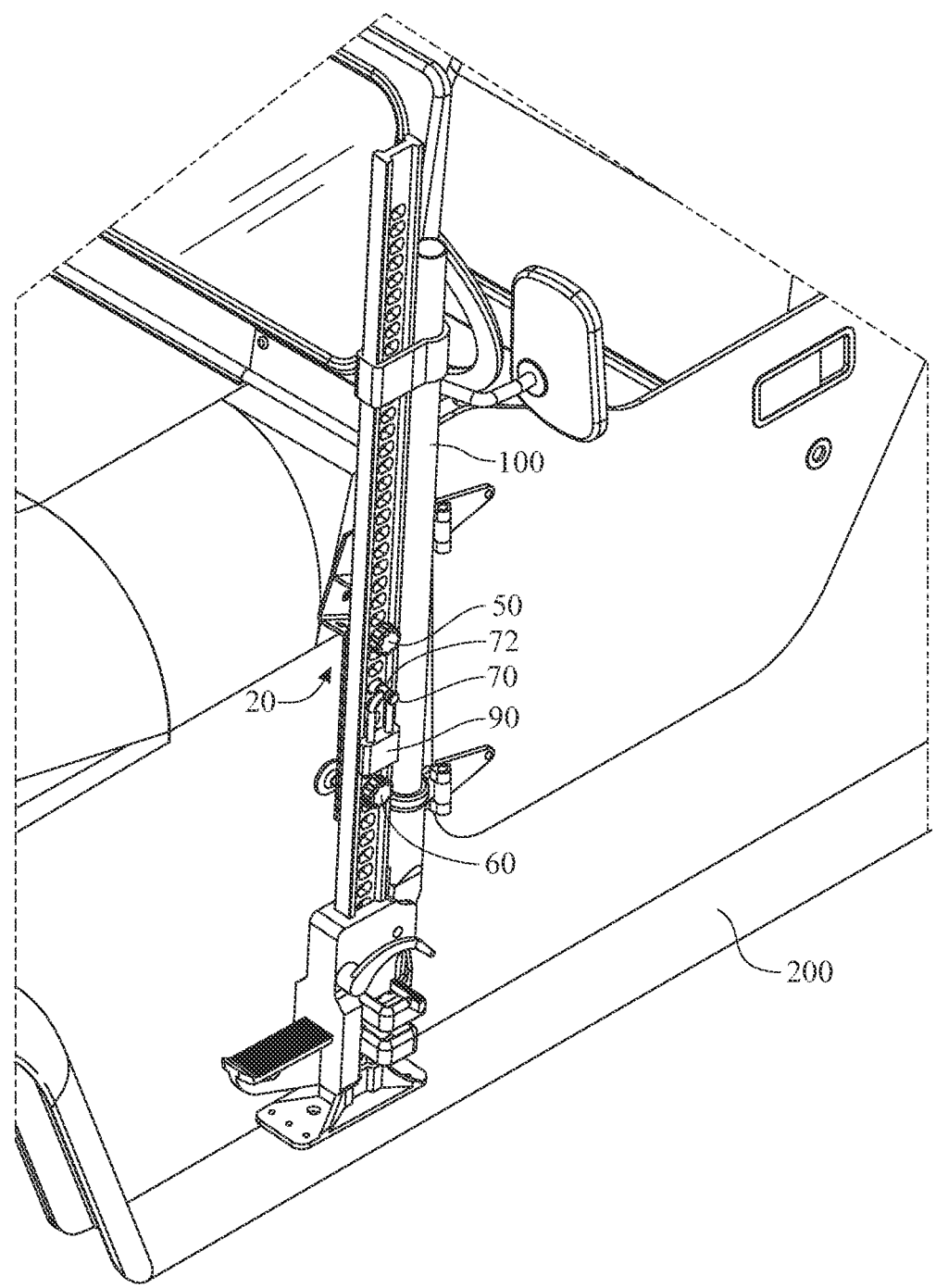
FIG. 6 shows the high lift jack mounting device, the high lift jack, and the vehicle of FIG. 4, shown in a third position in which the high lift jack has been attached to the bracket and a lock has been inserted through the locking pin and locked in order to secure the high lift jack to the bracket.

The rear attachment body portion 42 has an inner non-scratch layer 41 providing a non-scratch rear surface 41b (FIG. 1) for leaning on a vehicle surface. Alternatively, rubber gaskets 110 (see FIG. 7) can be provided between the rear attachment body portion 42 and the vehicle surface. The rear attachment body portion 42 is formed with holes 45 for allowing screws 47 (see FIG. 4) to pass through in order to attach the rear attachment body portion 42 to the vehicle 200. Locations of the holes 45 are selected in a way that when the high lift jack 100 is set in place on the bracket 20, the screws 47 attaching the bracket 20 to the vehicle 200 remain inaccessible so that the bracket 20 cannot be unscrewed from the vehicle 200 in order to steal the high lift jack 100. For instance, the holes 45 of the present embodiment are arranged behind the front body portion 31 and behind the high lift jack (when the high lift jack 100 is attached to the bracket 20 as shown in FIG. 6.

The front body portion 31, rear attachment body portion 42, sidewall portion 44 and connecting portions 32, 46 of the present embodiment are flat, planar o plate-shaped body portions preferably made of metal, such as but not limited to steel. The first body part 30 and the second body part 40 can be welded to one another to form a substantially rigid joint structure or body, while the connection portions 32, 46 rigidly connect the first body part 30 and the second body part 40. The bracket 20 can be provided with a powder coating finish or other applicable finish. As shown in FIG. 3, the sidewall portion 44 has a tab 43 for inserting into the corresponding lower slot 38 formed in the front body portion 31 of the first body part 30. Similarly, the connecting portion 46 has a tab 48 for inserting into the corresponding upper slot 37 formed in the front body portion 31 of the first body part 30. The connecting portion 32 of the first body part 30 has a tab 39 for inserting into a corresponding slot 49 formed in the rear attachment body portion 42. Welding between the first and second body parts 30, 40 can be carried out at or next to the intersections between the connecting portion 32 and the rear attachment body portion 42, between the front body portion 31 and the connecting portion 46, and between the front body portion 31 and the sidewall portion 44, such as at or next to the tab-slot connections. The three tab-slot connections enhance the strength of the connection between the first and second body parts 30 and 40, favoring that the bracket 20 provides a strong support for holding the high lift jack 100. In addition, having at least one tab-slot connection (that of tab 43 and lower slot 38) arranged substantially perpendicular to the other tab-slot connections (that of tabs 48, 39 and their corresponding slots 37, 49) contributes to increase the bracket's mechanical resistance to torsion forces.

The spacer 80 includes a support base 82 having a non-scratch rear surface 83 for leaning on a vehicle surface and a threaded connector 84 that passes through the transverse support connector hole 35 formed in the front body portion 31. A nut 86 is welded to the inner face of a bottom end of the front body portion 31, facing the spacer 80. The threaded connector 84 adjustably threads into a threaded cavity of the nut 86 and adjustably passes through the transverse support connector hole 35, allowing the adjustment of a distance D (FIG. 7) between the bottom end of the front body portion 31 of the first body part 30 and the support base 82. This adjustment helps readjust the depth of the bottom portion of the mounting device 10 in dependence of the exact vehicle outer surface configuration, in order to guarantee that the high lift jack 100 is arranged in generally parallel to the vehicle surface when attached to the mounting device 10.

Referring now to FIGS. 4 through 7, the mounting device 10 according to the exemplary embodiment of the present invention as shown in FIGS. 1 through 3 is shown together with an exemplary high lift jack 100 and an exemplary vehicle 200 in various positions to illustrate the process of attaching the high lift jack 100 to the vehicle 200 in a generally vertical position.

Figure 4:
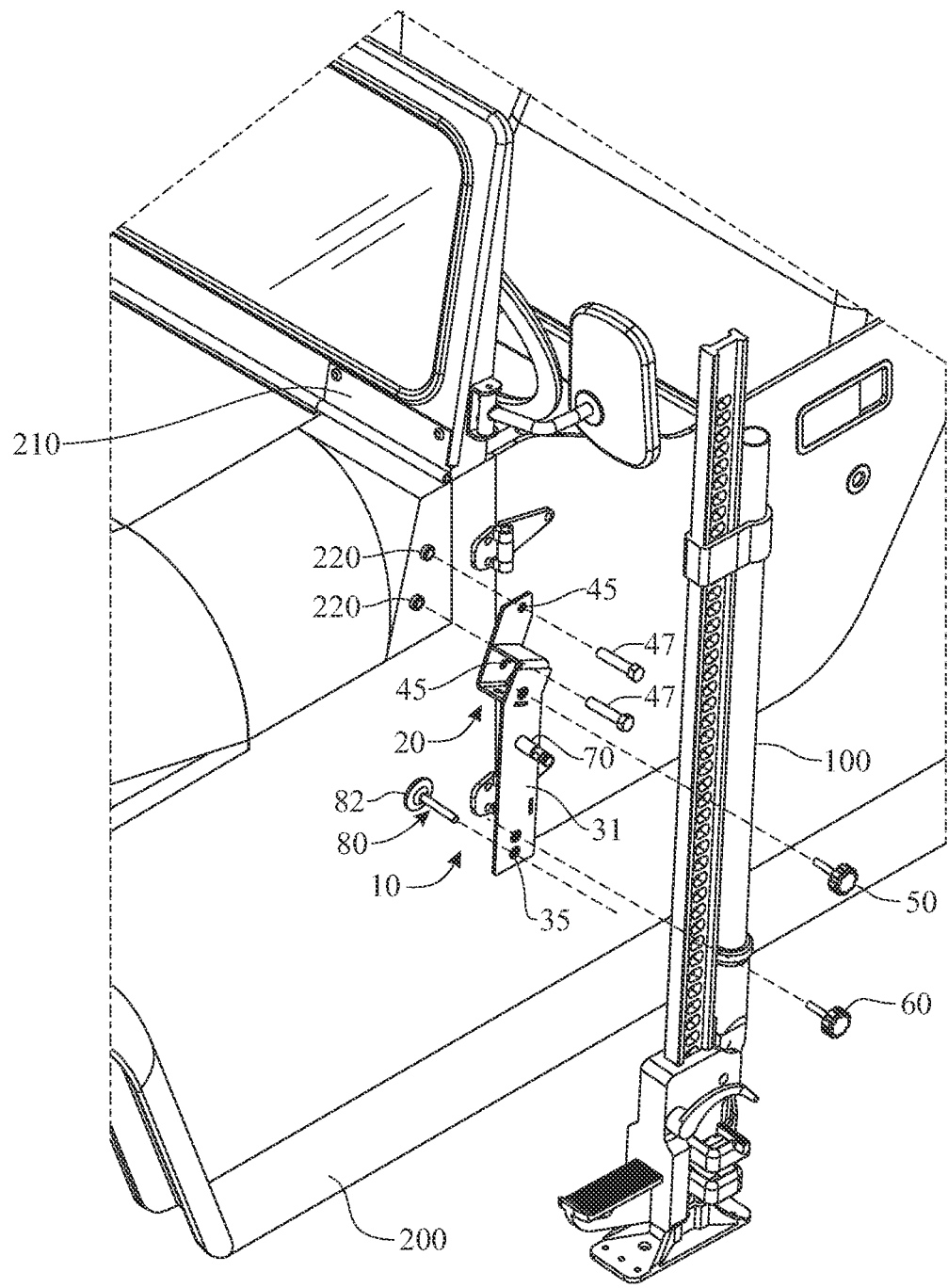
FIG. 4 is an isometric view of the high lift jack mounting device of FIG. 1, a high lift jack, and a vehicle, shown in a first position in which the high lift jack mounting device is shown prior to being attached to the vehicle.
Figure 5:
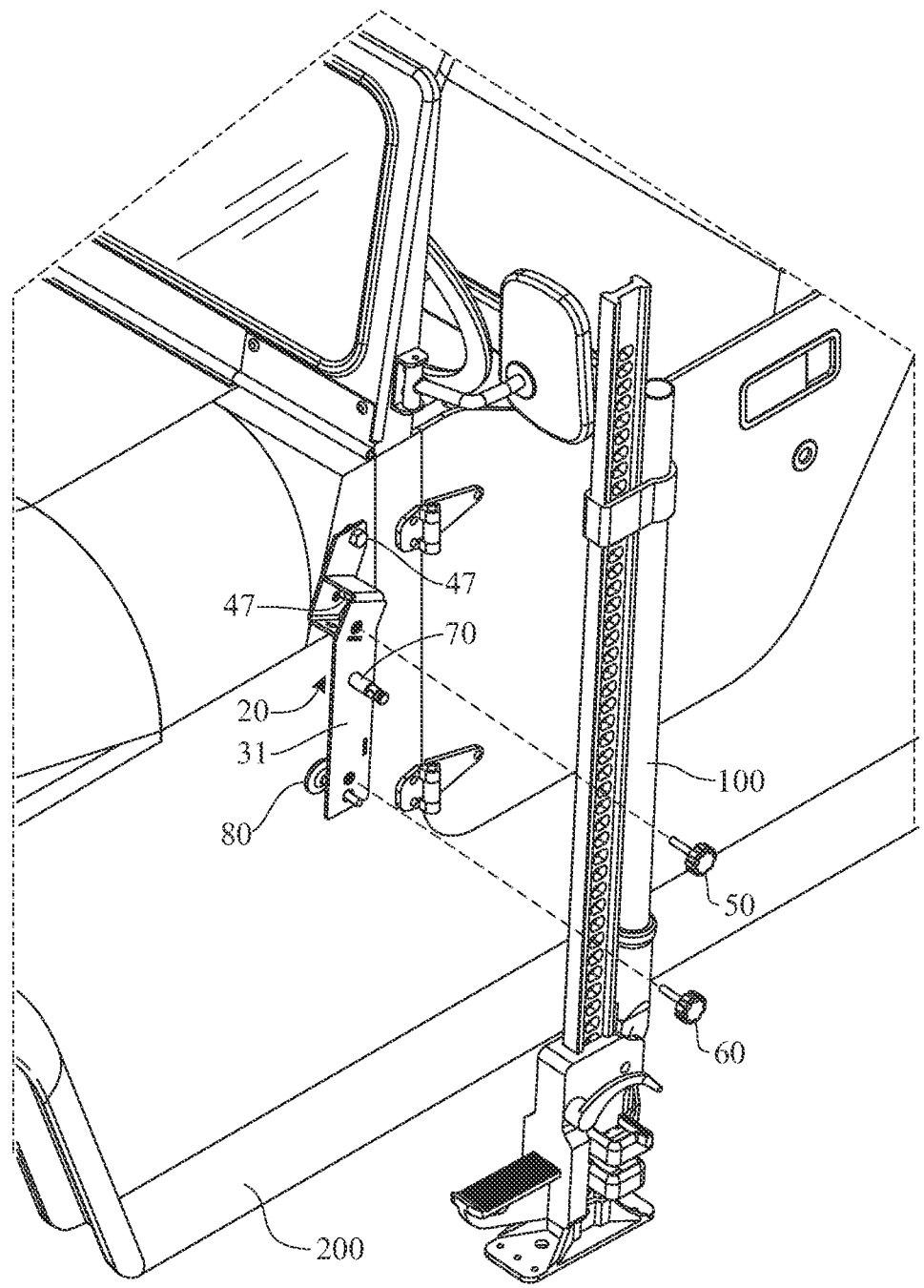
FIG. 5 shows the high lift jack mounting device, the high lift jack, and the vehicle of FIG. 4, shown in a second position in which the bracket has been attached to the vehicle.
Figure 7:
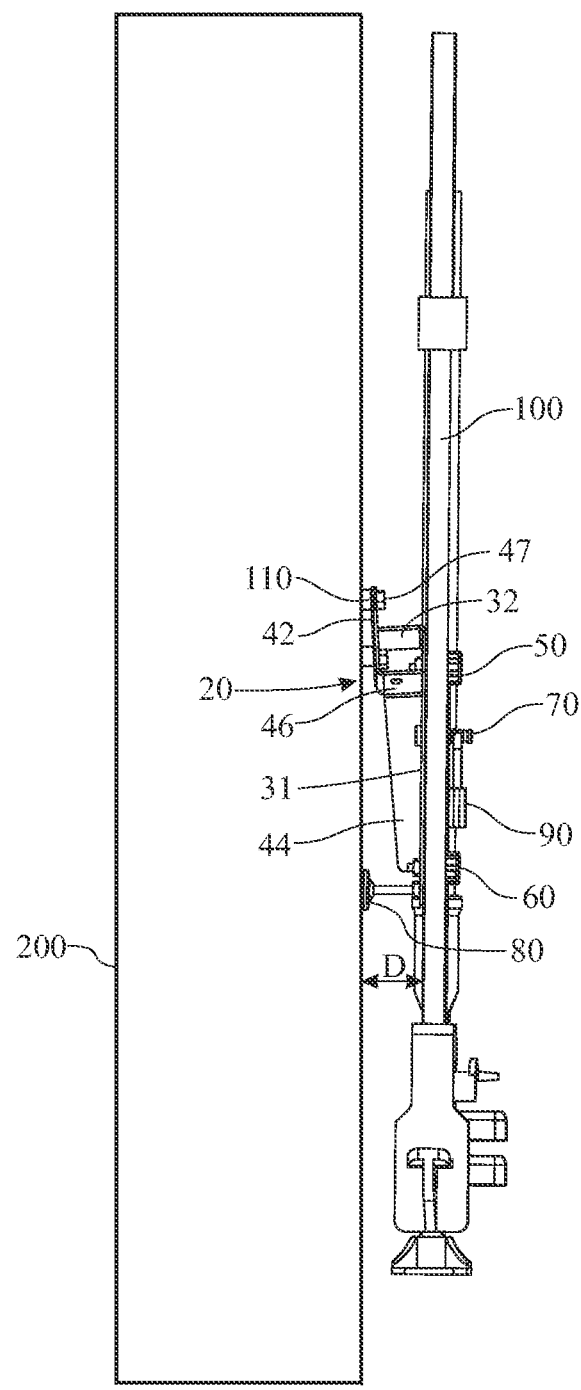
FIG. 7 is a side elevation view of the assembly of FIG. 6, where the vehicle is depicted only schematically.

The illustration of FIG. 4 shows a first position in which the mounting device 10 is shown prior to being attached to the vehicle 200. The vehicle 200 is a jeep-like model, of the kind that is provided with a front windshield hinge 210. As shown, the bracket 20 is placed in order to align the holes 45 with two corresponding holes 220 on a side surface of the vehicle 200. The spacer 80 is attached to the corresponding nut 86 (FIG. 3) and transverse support connector hole 35, and the support base 82 of the spacer 80 is rested on a side surface of the vehicle. Then, screws 47 are inserted through the holes 45, 220 and attached to the vehicle 200. The user may then rotate the spacer 80 to adjust the bracket position in order for the front body portion 31 to reach a generally vertical position. The illustration of FIG. 5 shows the bracket 20 attached to the vehicle 200 and generally vertically adjusted. The illustrations of FIGS. 6 and 7 show the mounting device 10 and high lift jack 100 in a third position in which the high lift jack 100 has been attached to the bracket 20 by placing it on the front body portion 31 while passing the locking pin 70 through an opening of the high lift jack 100, and attaching the upper nut bolt set 50 and the lower nut bolt set 60. The lock hole 72 of the locking pin 70 has become positioned on an outer side of the high lift jack 100, opposite to the bracket 20. A lock 90 has been inserted through the lock hole 72 of the locking pin 70 as shown in FIGS. 6 and 7, and has been locked in order to secure the high lift jack 100 to the bracket 20, thus securely attaching the high lift jack 100 to the vehicle 200. Alternatively, the locking pin 70 may instead have a lock (not shown herein) engaging the annular recess 71 located therein near the distal end of the locking pin 70 to secure the high lift jack 100 to the bracket 20, thus securely attaching the high lift jack 100 to the vehicle 200. In this position, the high lift jack 100 is adjacent to the bracket 20 and substantially blocks operative access to the screws 47. Thus, it is extremely cumbersome, if not impossible, to access screws 47 (FIG. 5) in order to detach the high light jack 100 and bracket 20 from the vehicle 200 without unlocking the lock 90.

While the bracket 20 is substantially rigid and rigidly attached to the vehicle by the screws 47, the spacer 80 resting against the surface of the vehicle 200 helps minimize or prevent any slight potential flexing or oscillating of the bracket 20 towards the surface of the vehicle 200.

Alternative embodiments are contemplated in which the materials, shape and/or size of the bracket 20, and more particularly of the first body part 30 and second body part 40, may vary. For instance, the shape, height and/or width of the front body portion 31, attachment portion 42, sidewall portion 44 and/or connecting portions 32, 46 may vary. In another example, the connecting portion 32 of the first body part 30, shown slightly tilted in the embodiment of FIG. 3, may alternatively be arranged horizontally, and perpendicular to the front body portion 31. With continued reference to FIG. 3, the connecting portion of the second body part 40 could be arranged horizontally, and perpendicular to the sidewall portion 44. The rear attachment body portion 42, which is shown tilted towards a side, could alternatively be directed upward.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A mounting device for attaching a high lift jack to a vehicle, comprising:
    a bracket to be attached to the vehicle, the bracket comprising:
        a front body portion having a front face and a rear face;
        a locking pin protruding frontward from the front face of the front body portion, the locking pin comprising an arrangement for receiving a locking member defined in the locking pin and arranged frontward of and in a spaced-apart configuration from the front face of the front body portion;
        a rear attachment body portion, arranged rearward of the rear face of the front body portion and supporting, in a spaced-apart configuration, the front body portion; and
        at least one connecting portion extending between the front body portion and the rear attachment body portion; and
    a spacer extending rearward from the front body portion, the spacer including a support base arrangeable in a spaced-apart configuration from the rear face of the front body portion.

2. The mounting device of claim 1, wherein the rear attachment body portion defines a plurality of holes therethrough for attachment of the rear attachment body portion to a vehicle surface to which the mounting device is to be attached.

3. The mounting device of claim 2, wherein the rear attachment body portion comprises a non-scratch rear surface for interfacing with the vehicle surface.

4. The mounting device of claim 2, wherein the rear attachment body portion comprises a rubber gasket at each hole of the plurality of holes for attachment to a vehicle surface, the rubber gasket arranged rearward from said each hole for interfacing with the vehicle surface.

5. The mounting device of claim 1, wherein the front body portion, the rear attachment body portion, and the at least one connecting portion are plate-shaped.

6. The mounting device of claim 5, wherein the at least one connecting portion extends rearward and perpendicularly from the front body portion.

7. The mounting device of claim 6, wherein the bracket further comprises a sidewall portion affixed to and extending rearward and perpendicularly from the front body portion and affixed to a connecting portion of the at least one connecting portion.

8. The mounting device of claim 1, wherein the spacer is adjustable with respect to the front body portion to adjust a separation of the support base of the spacer with respect to the rear face of the front body portion.

9. The mounting device of claim 8, wherein the spacer further comprises at a first end thereof a threaded connector engaged with a threaded cavity of the front body portion, and wherein the support base is arranged at a second end of the spacer opposite from the first end.

10. The mounting device of claim 1, wherein the support base of the spacer comprises a non-scratch rear surface for bearing against a vehicle surface to which the mounting device is attached.

11. A mounting device for attaching a high lift jack to a vehicle, comprising:
   a bracket to be attached to the vehicle, the bracket including:
      a front body portion defining at least two holes spaced apart one from the other a distance corresponding to at least two openings in a high lift jack to be attached thereto;
      an upper nut and bolt set at a first of the at least two holes and a lower nut and bolt set at a second of the at least two holes;
      a locking pin extending outwardly from the front body portion, the locking pin comprising an arrangement for receiving a locking member defined therein and arranged outward of and in a spaced-apart configuration with the front body portion;
      a rear attachment body portion defining a set of holes therethrough for attachment to a vehicle surface;
      at least one connecting portion affixed to the front body portion and to the rear attachment body portion, and maintaining the front body portion in a spaced-apart relationship to the rear attachment body portion; and
   a spacer extending rearward from the front body portion, the spacer including a support base arrangeable rearward and in a spaced-apart configuration from the front body portion.

12. The mounting device of claim 11, wherein the rear attachment body portion includes an outer, rear non-scratch layer for interfacing with the vehicle surface.

13. The mounting device of claim 11, wherein the rear attachment body portion includes a rubber gasket at each hole of the set of holes for attachment to the vehicle surface for interfacing with the vehicle surface.

14. The mounting device of claim 11, wherein the spacer is adjustable with respect to the front body portion to adjust a separation of the support base of the spacer with respect to the front body portion.

15. The mounting device of claim 14, wherein the spacer further comprises at a first end thereof a threaded connector engaged with a threaded cavity of the front body portion, and wherein the support base is arranged at a second end of the spacer opposite to the first end.

16. The mounting device of claim 11, wherein the support base of the spacer comprises a non-scratch rear surface for bearing against the vehicle surface.

17. The mounting device of claim 11, wherein the nut of each of the upper nut and bolt set and the lower nut and bolt set is welded to the front body portion at a respective one of the at least two holes of the front body portion.

18. A mounting device for attaching a high lift jack to a vehicle, comprising:
   a front body portion defining at least two holes spaced apart one from the other a distance corresponding to at least two openings in a high lift jack to be attached thereto;
   an upper nut and bolt set at a first of the holes and a lower nut and bolt set at a second of the holes;
   a locking pin extending outwardly from the front body portion, the locking pin comprising an arrangement for receiving a locking member defined therein and arranged outward of and in a spaced-apart configuration with the front body portion; and
   a rear attachment body portion defining a set of holes therethrough for attachment to a vehicle surface;
   at least one connection portion affixed to the front body portion and maintaining the front body portion in a spaced-apart relationship to the rear attachment body portion; and
   a spacer extending rearward from the front body portion, the spacer comprising at a first end thereof a threaded connector engaged with a threaded cavity of the front body portion, and a support base affixed to a second end of the threaded connector opposite to the first end, wherein the spacer is adjustable with respect to the front body portion to adjust a separation of the base support of the spacer with respect to the front body portion.

19. The mounting device of claim 18, wherein the rear attachment body portion includes an outer, rear non-scratch layer for interfacing with the vehicle surface.

20. The mounting device of claim 18, wherein the base support base of the spacer includes a non-scratch rear surface for bearing against the vehicle surface.

* * * * *